(12) United States Patent
Kitanaka et al.

(10) Patent No.: US 7,355,391 B2
(45) Date of Patent: Apr. 8, 2008

(54) ELECTROMECHANICAL CONVERSION DEVICE

(75) Inventors: Tatsuya Kitanaka, Nagoya (JP); Koichiro Matsumoto, Kariya (JP); Takashi Kawashima, Nagoya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/524,310

(22) Filed: Sep. 21, 2006

(65) Prior Publication Data

US 2007/0063599 A1  Mar. 22, 2007

(30) Foreign Application Priority Data

Sep. 21, 2005  (JP) .............................. 2005-273186

(51) Int. Cl.
*G01B 7/30* (2006.01)
(52) U.S. Cl. .............................. 324/207.25; 324/207.2; 324/207.12; 324/207.24
(58) Field of Classification Search ............................... 324/207.12–207.26, 225; 338/32 H, 32 R
See application file for complete search history.

(56) References Cited

U.S. PATENT DOCUMENTS

2006/0061354 A1*  3/2006  Wallance et al.  ...... 324/207.15

FOREIGN PATENT DOCUMENTS

| JP | 62-95402 | 5/1987 |
| JP | 10-141993 | 5/1998 |

* cited by examiner

*Primary Examiner*—Jay M Patidar
(74) *Attorney, Agent, or Firm*—Nixon & Vanderhye P.C.

(57) ABSTRACT

An electromechanical conversion device includes an electromechanical conversion unit and a cable, which has a signal wire and a ground wire for grounding the electromechanical conversion unit. The electromechanical conversion unit performs a conversion between a relative movement with respect to a magnetic field generation unit and electrical signals, based on a magnetic field generated by the magnetic field generation unit. The signal wire is connected with the electromechanical conversion unit to transfer the electrical signals, and has a first branch portion and a second branch portion which extend substantially parallel to the ground wire and are respectively arranged at two opposite sides of the ground wire. A distance between the first branch portion and the ground wire is substantially equal to that between the second branch portion and the ground wire.

8 Claims, 8 Drawing Sheets

| Va | Vb | ROTATION ANGLE (deg) |
|---|---|---|
| + | + | 0 ~ 90 |
| + | − | 90 ~ 180 |
| − | − | 180 ~ 270 |
| − | + | 270 ~ 360 |

ELECTROMECHANICAL CONVERSION DEVICE

CROSS REFERENCE TO RELATED APPLICATION

This application is based on a Japanese Patent Application No. 2005-273186 filed on Sep. 21, 2005, the disclosure of which is incorporated herein by reference.

FIELD OF THE INVENTION

The present invention relates to an electromechanical conversion device.

BACKGROUND OF THE INVENTION

Generally, for example, as disclosed in JP-62-095402A, an electromechanical conversion device such as a rotation angle detection device is provided to detect a rotation angle of a detection object based on a magnetic field which varies due to a rotation of the detection object. In this case, a magnetism detection element such as a Hall element is interlocked with the rotation of the detection object to relatively rotate with respect to a magnetic field generation unit such as a permanent magnet. Thus, the rotation angle detection device can detect the rotation angle of the detection object based on signals, which are outputted from the magnetism detection element and varies with the rotation of the detection object.

Moreover, it is also known a synchronous motor (being an electromechanical conversion device) which includes a stator and a rotor. The stator has a three-phase winding. The rotor has the permanent magnet or the like as the magnetic field generation unit. In this case, the rotor rotates with respect to the stator, responding to signals inputted to the stator.

However, in the electromechanical conversion device such as the rotation angle detection device and the synchronous motor, the magnetism detection element (which is electromechanical conversion unit) and the rotor relatively move with respect to the magnetic field generation unit. Thus, the magnetic field in the proximity of the electromechanical conversion unit greatly varies. Therefore, induction noise is piggybacked onto the outputted signal and the inputted signal of the electromechanical conversion unit, due to the variation of the magnetic field. As a result, for example, the error of the rotation angle detection device in detecting the rotation angle increase. The synchronous motor malfunctions.

In order to reduce the induction noise piggybacked onto the outputted signal and the inputted signal of the electromechanical conversion device, it is considered that the outputted signal and the inputted signal of the electromechanical conversion device are transferred via twisted pair cables, as disclosed in JP-10-141993A. However, because unevenness of the weaving of the signal wires cannot be completely eliminated, the noise countermeasures via the twisted pair cables is unsatisfactory in the case where the signal amplitude of the outputted/inputted signal of the electromechanical conversion device is small.

SUMMARY OF THE INVENTION

In view of the above-described disadvantages, it is an object of the present invention to provide an electromechanical conversion device where induction noise piggybacked onto inputted/outputted signals is reduced.

According to the present invention, the electromechanical conversion device is provided with a magnetic field generation unit for generating a magnetic field, an electromechanical conversion unit which performs one of a first conversion and a second conversion based on the magnetic field, and a cable which is connected with the electromechanical conversion unit. The first conversion is a conversion from a relative movement of the electromechanical conversion unit with respect to the magnetic field generation unit, to electrical signals. The second conversion is a conversion from electrical signals inputted to the electromechanical conversion unit, to a relative movement of the electromechanical conversion unit with respect to the magnetic field generation unit. The cable includes a ground wire for connecting the electromechanical conversion unit with the ground, and at least one signal wire having a first branch portion and a second branch portion which extend substantially parallel to the ground wire and are respectively arranged at two opposite sides of the ground wire to interpose the ground wire therebetween. Two ends of the second branch portion are respectively connected with two ends of the first branch portion. The signal wire is connected with the electromechanical conversion unit to transfer the electrical signals.

Because the electromechanical conversion unit relatively moves with respect to the magnetic field generation unit, there occurs a variation of magnetic flux passing through a circuit which is constructed of the signal wire and the ground wire of the cable connected with the electromechanical conversion unit. Thus, an inductive electromotive force occurs at the circuit constructed of the signal wire and the ground wire. According to the present invention, the signal wire has the first branch portion and the second branch portion which extend along the ground wire and are respectively arranged the two opposite sides of the ground wire. That is, the first branch portion and the second branch portion respectively construct two circuits (i.e., loops) which share the ground wire as a common feedback path. Because the first branch portion and the second branch portion are respectively arranged the two opposite sides of the ground wire, the direction of the inductive electromotive force (caused due to variation of magnetic flux passing through loop) at the first branch portion is contrary to that at the second branch portion.

Therefore, even when the induction electromotive force occurs at the signal wire, the induction electromotive force occurring at the first branch portion and that occurring at the second branch portion substantially balance each other out to reduce induction noise piggybacked onto the electronic signals, which is transferred via the signal wire to be inputted or outputted to the electromechanical conversion unit.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

Preferred Embodiment

An electromechanical conversion device 1 according to the present invention can be suitably used as a rotation angle detection device, for example, a crank angle detection device which is mounted in an ignition system for an internal-combustion engine or the like.

Figure 1:
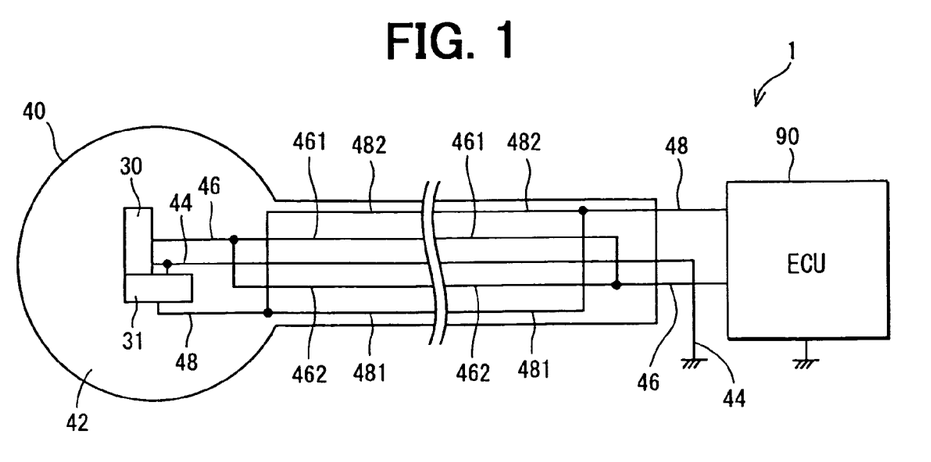
FIG. 1 is a schematic view showing a rotation angle detection device according to a preferred embodiment of the present invention.

Referring to FIG. 1, the rotation angle detection device 1 outputs electrical signals which are related to angles (e.g., crank angles) of a detection object (e.g., crank shaft), to an electronic control unit (ECU) 90 of the internal-combustion engine. The ECU 90 detects the crank angles based on the electrical signals outputted form the rotation angle detection device 1, and determines which cylinder is to be ignited according to the detected crank angle, for example.

Figure 2A:
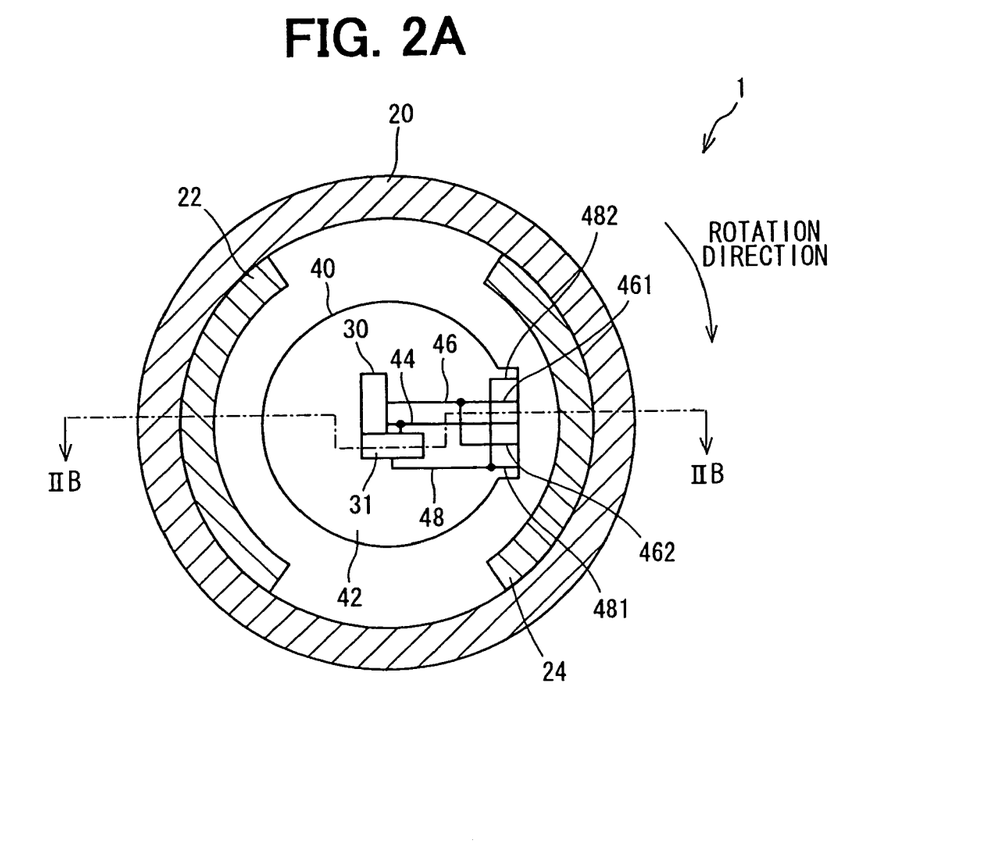
FIG. 2A is a partially sectional view showing the rotation angle detection device according to the preferred embodiment.
Figure 2B:
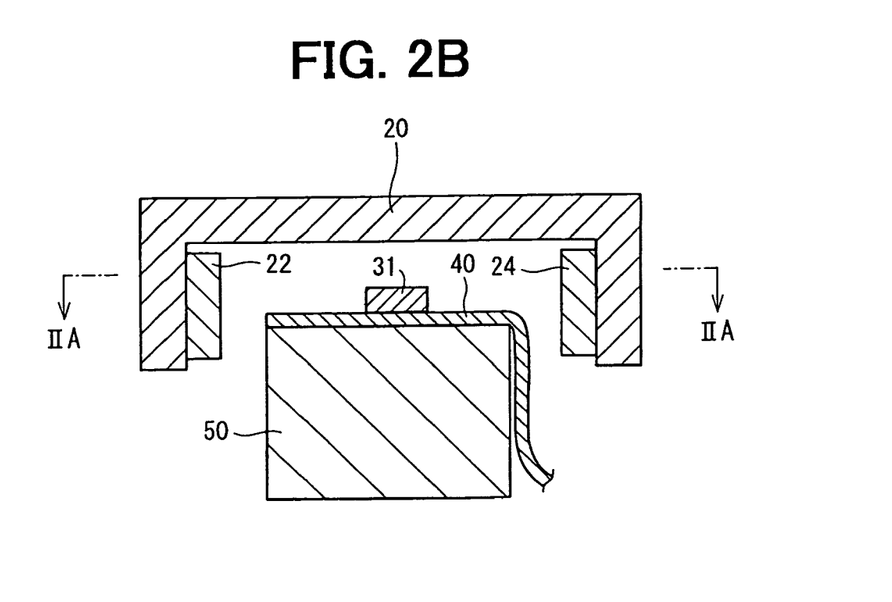
FIG. 2B is a partially sectional view taken along a line IIB-IIB in FIG. 2A.

FIG. 2A shows a construction of the rotation angle detection device 1, and FIG. 2B is a partially sectional view taken along a line IIB-IIB in FIG. 2A. FIG. 2A is taken along a line IIA-IIA in FIG. 2B.

As showing in FIGS. 2A and 2B, the rotation angle detection device 1 has a yoke 20 with a substantial cylinder shape, a pair of permanent magnets 22, 24 for generating a parallel magnetic field, a magnetism detection member, a flexible printed circuit (FPC) 40, a supporting member 50 and the like. The magnetism detection member can include a first magnetism detection element 30 and a second magnetism detection element 31, each of which can be constructed of a Hall element, for example.

Each of the yoke 20 and the permanent magnets 22, 24 is a magnetic field generation unit, and rotated along with the detection object. The permanent magnet 22, 24 is provided with a substantial arc shape, and fixed to an inner wall of the yoke 20.

In this case, the permanent magnets 22 and 24 are arranged at the inner wall of the substantially cylindrical yoke 20 to be opposite to each other. That is, the permanent magnets 22 and 24 are mounted to the inner wall of the yoke 20 with a central angle (with respect to center of yoke 20) of substantial 180° therebetween. Thus, the substantially even magnetic field is generated between the permanent magnets 22 and 24. In following description, the magnetic field means the parallel magnetic field generated between the permanent magnets 22 and 24.

The Hall elements 30 and 31, which construct an electromechanical conversion unit, is fixed to the FPC 40 which is fixedly attached to the supporting member 50. The supporting member 50 is not rotated along with the rotation of the detection object. Thus, the Hall elements 30 and 31 will relatively rotate with respect to the yoke 20 and the permanent magnet 22, 24, due to the rotation of the detection object.

Figure 3A:
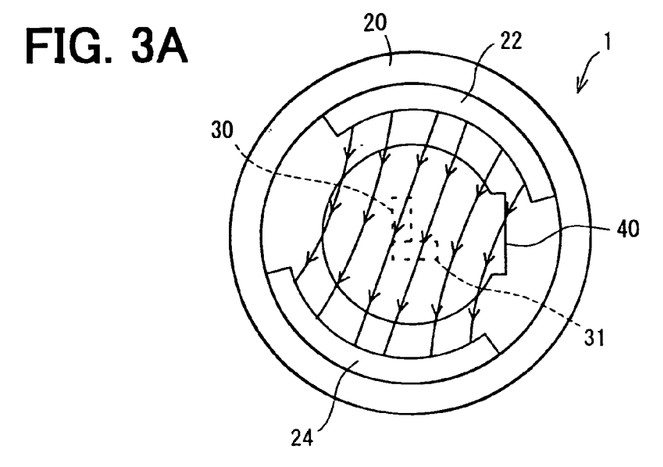
FIGS. 3A, 3B and 3C are schematic views showing a magnetic field generated by permanent magnets in the case of different rotation angles of a detection object according to the preferred embodiment.
Figure 3B:
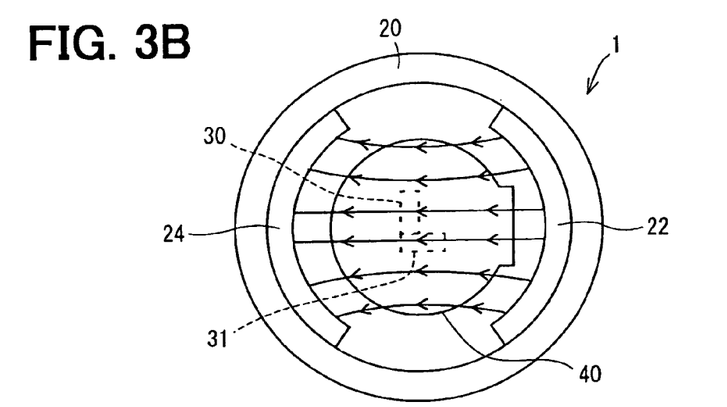
Figure 3C:
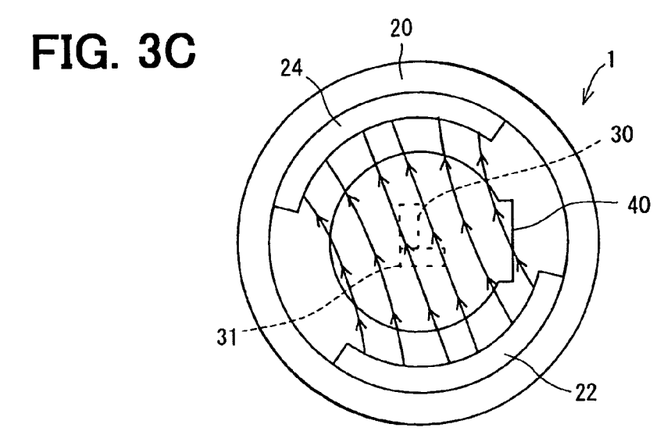

The Hall elements 30 and 31 can be arranged to have an angle, for example, substantial 90° therebetween in a rotation direction of the detection object. The Hall elements 30 and 31 are supplied with a constant current through power wires (not shown). As shown in FIGS. 3A, 3B and 3C, it is preferable that the Hall elements 30 and 31 are arranged to be adjacent to the center of the yoke 20, so that the parallel magnetic field having a substantially even magnetic flux density can be applied to the Hall elements 30 and 31 substantially without being influenced by the rotation angle of the detection object.

Because the Hall elements 30 and 31 are mounted to the FPC 40, the number of the components of the rotation angle detection device 1 can be reduced and the connection part of the component can be reduced as compared with the case where the Hall elements 30 and 31 are connected to the FPC 40 via other apparatuses. Thus, the manufacture cost of the rotation angle detection device 1 can be reduced.

Alternatively, the Hall element 30, 31 can be also arranged without being mounted to the FPC 40. For example, the Hall elements 30 and 31 can be connected with a FPC which has a same ground wire and same signal wires as those of the FPC 40, through a printed circuit board where the Hall elements 30 and 31 are mounted.

As shown in FIG. 1, the FPC 40 as a cable includes a film 42, a ground wire 44, signal wires 46 and 48, and the like. The film 42 is a film-shaped electrically insulating member which is made of PET, PI or the like. The ground wire 44, the signal wires 46 and 48 are made of an electrically conductive material such as Cu, and fixedly formed at the film 42. That is, the ground wire 44 and the signal wire 46, 48 are arranged in the substantially same plane.

Two ends of the ground wire 44 are respectively connected with the ground, and the grounding terminal of the Hall element 30, 31. Here, the ground means an electrical conductor which provides a criterion potential for the Hall element 30, 31 (electromechanical conversion unit).

Two ends of the signal wire 46 are respectively connected with an output terminal of the Hall element 30 and the ECU 90. The signal wire 46 transmits the electrical signals outputted from the Hall element 30 to the ECU 90. The signal wire 46 has a first branch portion 461 and a second branch portion 462, which extend substantially parallel to the ground wire 44 and are arranged at two opposite sides of the ground wire 44. That is, the ground wire 44 is interposed between the first branch portion 461 and the second branch portion 462. Two ends of the second branch portion 462 are respectively connected with two ends of the first branch portion 461.

Two ends of the signal wire 48 are respectively connected with an output terminal of the Hall element 31 and the ECU 90. The signal wire 48 transmits the electrical signals outputted from the Hall element 31 to the ECU 90. Similarly to the signal wire 46, the signal wire 48 has a first branch portion 481 and a second branch portion 482, which extend parallel to the ground wire 44 and are arranged at the two opposite sides of the ground wire 44. That is, the ground wire 44 is interposed between the first branch portion 481 and the second branch portion 482. Two ends of the second branch portion 482 are respectively connected with two ends of the first branch portion 481.

The ECU 90 includes a nonvolatile memory such as a flash memory which memorizes a rotation angle detection program, a volatile memory which temporarily memorizes the rotation angle detection program and various data, a CPU which performs the rotation angle detection program expanded in the volatile memory.

When the detection object rotates, the Hall elements 30 and 31 relatively rotate with respect to the permanent magnets 22 and 24 which rotate along with the detection object. The direction of the magnetic field which influences the Hall elements 30 and 31 varies due to the rotation of the detection object, as shown in FIGS. 3A, 3B and 3C.

Figure 4A:
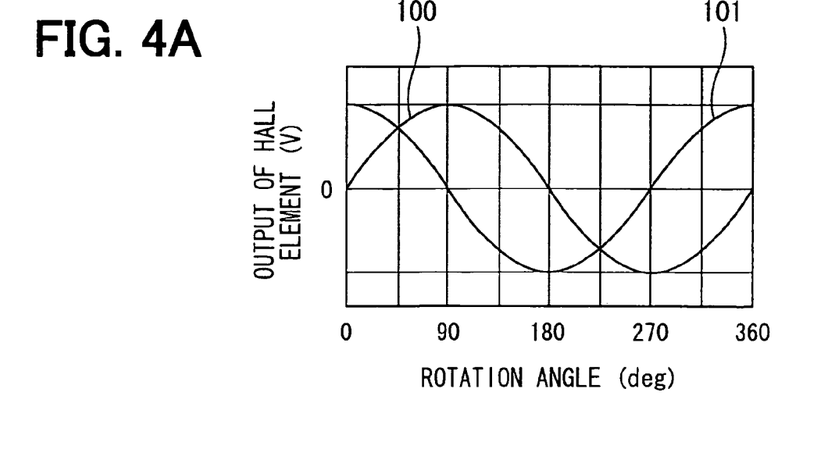
FIG. 4A is a graph showing a relation between the rotation angles and output signals of a Hall element based on a rotation angle detection method according to the preferred embodiment.

Referring to FIG. 4A, due to the variation of the direction of the magnetic field (that is, variation of rotation angle of detection object), the Hall elements 30 and 31 respectively output the output signal 100 (e.g., voltage signal) and the output signal 101 (e.g., voltage signal), each of which has a sinusoidal waveform.

Because the Hall elements 30 and 31 are arranged to have substantial 90° therebetween in the rotation direction of the detection object, the phrase difference between the output signal 100 of the Hall element 30 and the output signal 101 of the Hall element 31 is substantial 90°. That is, the output signal 100 of the Hall element 30 and the output signal 101 of the Hall element 31 have a sine-cosine relation with each other.

Therefore, the following formulas (1) and (2) can be attained, $$Va = kBI \times \sin\theta \quad (1)$$

$$Vb = kBI \times \sin(\theta+90) = kBI \times \cos\theta \quad (2)$$

wherein θ represents the rotation angle of the detection object, Va represents the output signal 100 of the Hall element 30, Vb represents the output signal 101 of the Hall element 31, k represents a coefficient which is determined by a sensitivity of the Hall element 30, 31, B represents a magnetic flux density of the magnetic field generated by the permanent magnets 22 and 24, and I represents a constant current which is supplied for the Hall element 30, 31.

The ECU 90 detects the rotation angle of the detection object based on the output signal 100 transmitted thereto via the signal wire 46 and the output signal 101 transmitted thereto via the signal wire 48. Specifically, the ECU 90 performs a process (described later) with respect to the output signals 100 and 101, to detect the rotation angle of the detection object. This process is performed by the CPU of the ECU 90 which executes the rotation angle detection program. The rotation angle detection program is constantly executed during the operation of the rotation angle detection device 1.

Figure 4B:
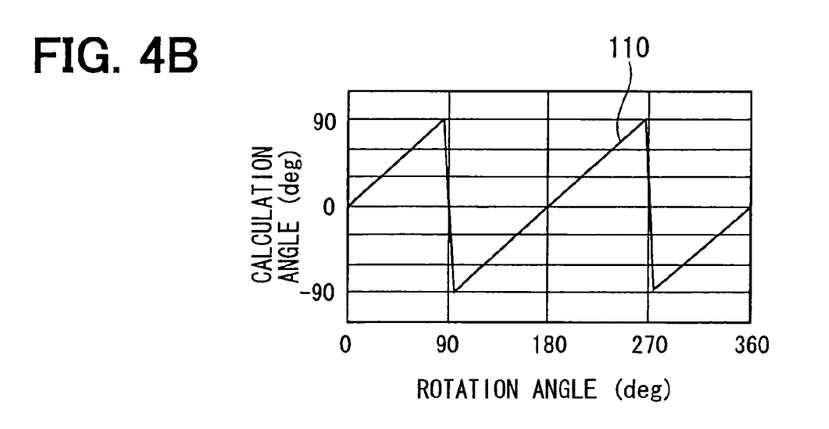
FIG. 4B is a graph showing a relation between the rotation angles and calculation angles based on the rotation angle detection method.

At first, the ECU 90 calculates tan θ according to a ratio of Va to Vb, referring to the following formula (3). Then, the ECU 90 calculates a calculation angle via an arc tangent calculation, referring to the following formula (4). As shown in FIG. 4B, the calculation angles 110 have a periodicity of 180°.

$$Va/Vb = \sin\theta/\cos\theta = \tan\theta \quad (3)$$

$$\theta = \arctan(Va/Vb) \quad (4)$$

Figure 4C:
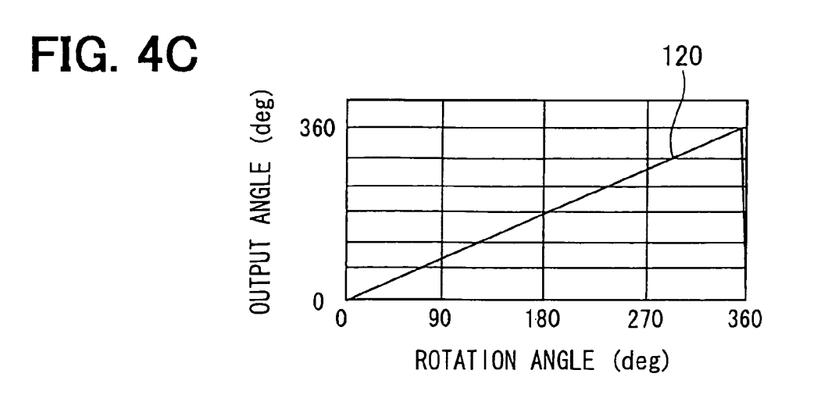
FIG. 4C is a graph showing a relation between the rotation angles and output angles based on the rotation angle detection method.
Figure 5:
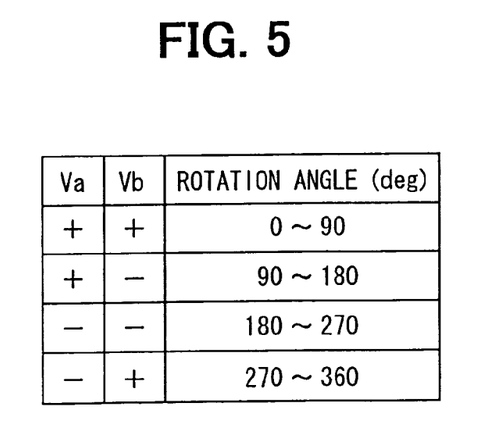
FIG. 5 is a diagram showing an identification of the rotation angle of the detection object based on the rotation angle detection method according to the preferred embodiment.

Subsequently, the ECU 90 determines signs of Va and Vb with reference to FIG. 5, to identify the rotation angle position of the detection object within the angle range of 360°. Then, the ECU 90 adds an offset angle to the calculation angle 110 based on the identified rotation angle position of the detection object, to determine the rotation angle 120, as shown in FIG. 4C. Thus, the rotation-angle detection device 1 can detect the rotation angle of the detection object in the angle range of 360°.

However, induction noise is piggybacked (superposed) onto the output signals of the Hall elements 30 and 31, because the magnetic field varies due to the rotation of the detection object. Particularly, the component of the magnetic field which is orthogonal to the signal wires 46 and 48 increases at the part of the FPC 40 which extends in the rotation axis direction of the yoke 20. Thus, the significant induction noise is piggybacked onto the output signals. As a result, an error in detecting the rotation angle may increase.

Next, the countermeasures against noise which is taken in the rotation angle detection device 1 according to this embodiment will be described with comparing with conventional rotation angle detection devices 200 and 300.

Figure 6:
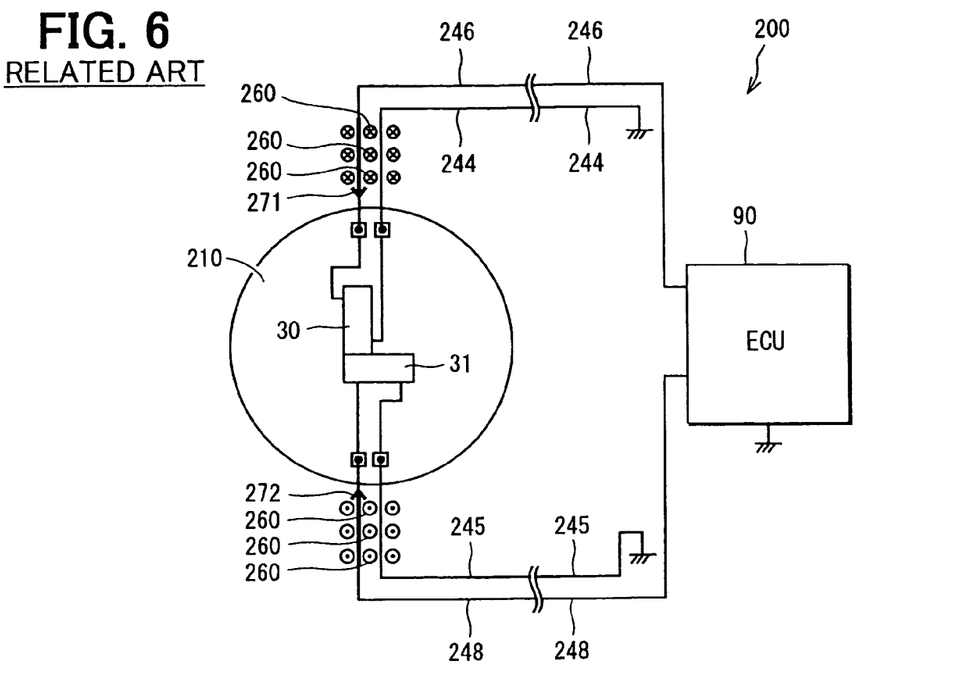
FIG. 6 is a schematic view showing a rotation angle detection device as a first comparison example according to a related art.

FIG. 6 shows the conventional rotation angle detection device 200 as a first comparison example. The rotation angle detection device 200 is not provided with the FPC 40, but has components similar to the other components of the rotation angle detection device 1 of this embodiment. Thus, in the following description, the components of the rotation angle detection device 200 which correspond to those of the rotation angle detection device 1 are respectively provided with same reference numbers as the rotation angle detection device 1.

Referring to FIG. 6, the Hall elements 30 and 31 of the rotation angle detection device 200 are mounted at a printed circuit board 210 which is attached to a supporting member. The Hall element 30 is connected with the ECU 90 via a signal wire 246 and a ground wire 244 which are arranged substantially parallel to each other. The Hall element 31 is connected with the ECU 90 via a signal wire 248 and a ground wire 245 which are arranged substantially parallel to each other.

The signal wire 246 and the ground wire 244 (as a feedback path) constructs a circuit. When the magnetic flux through the circuit constructed by the signal wire 246 and the ground wire 244 varies, an inductive electromotive force will occur at the signal wire 246.

For example, as shown in FIG. 6, in the case where the magnetic flux 260 directing from the front side of the paper toward the back side of the paper increases, there will occur at the signal wire 246 the inductive electromotive force having the direction indicated by the arrow 271. In this case, the inductive electromotive force occurring at the each part of the signal wire 246 has a same direction. Thus, the following formula (5) can be attained, $$Ve = \omega abB \sin \theta \quad (5)$$

wherein Ve represents the inductive electromotive force occurring at the signal wire 246, a represents the length of the signal wire 246, b represents the distance between the signal wire 246 and the ground wire 244, B represents the magnetic flux density of the magnetic field generated by the permanent magnets 22 and 24, and w represents the angular velocity of the rotation of the detection object.

Similarly, when the magnetic flux passing through the circuit constructed by the signal wire 248 and the ground wire 245, there will occur at the signal wire 248 the inductive electromotive force having the direction indicated by the arrow 272 in FIG. 6.

Figure 7:
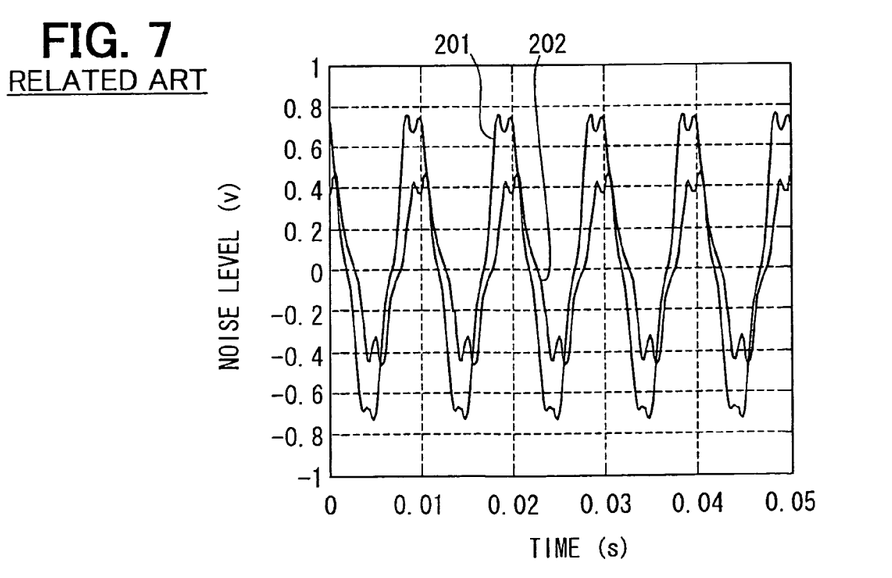
FIG. 7 is a graph showing a measure result of a noise experiment of the rotation angle detection device of the first comparison example according to the related art.

FIG. 7 shows a measurement result of the noise piggybacked onto the output signal of the rotation angle detection device 200 of the first comparison example. The X axis (lateral axis) of the graph in FIG. 7 represents the time, and the Y axis (longitudinal axis) of the graph represents the noise level which is calculated by multiplying the voltage signal (noise) by 400. The measurement result has been measured under the condition that the angular velocity ω of the rotation of the detection object is substantial 200πrad/s and the magnetic flux density B of the magnetic flux generated by the permanent magnets 22 and 24 is substantial 80 mT.

Referring to FIG. 7, the noise 201 of substantial 3.7 mV and the noise 202 of substantial 2.3 mV are respectively piggybacked onto the output signal transmitted by the signal wire 246 and that transmitted by the signal wire 248. The noise of substantial 3.7 mv with respect to the 5V-wide output signal corresponds to the rotation angle of 0.266° of the detection object. The noise of substantial 2.3 mv with respect to the 5V-wide output signal corresponds to the rotation angle of 0.166° of the detection object. Thus, the detection error of the rotation angle detection device 200 will increase due to the induction noise piggybacked onto the output signals 100 and 101.

Referring to the formula (5), the inductive electromotive force occurring in the signal wire 246 can be reduced, for example, by shortening the length a of the signal wire 246 or/and reducing the distance b between the signal wire 246 and the ground wire 244, that is, by reducing the loop area ab of the circuit constructed by the signal wire 246 and the ground wire 244. However, there exists a construction limit and a manufacture limit in shortening the signal wire and reducing the distance between the signal wire and the ground wire. Moreover, even when these noise countermeasures are performed, the inductive electromotive force occurring in the signal wire will increase with the increase of the angular velocity of the rotation of the detection object with reference to the formula (5). Thus, the detection error of the rotation angle detection device 200 increases.

Figure 8:
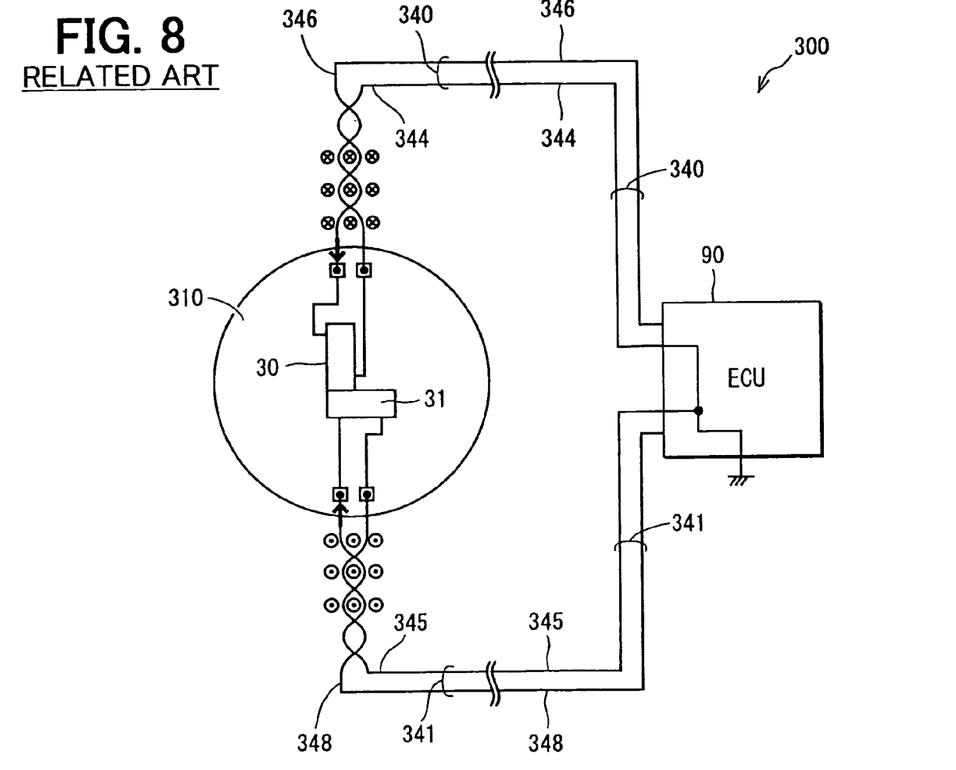
FIG. 8 is a schematic view showing a rotation angle detection device as a second comparison example according to a related art.

FIG. 8 shows the conventional rotation angle detection device 300 as a second comparison example with respect to the rotation angle detection device 1 of this embodiment.

The rotation angle detection device 300 is not provided with the FPC 40, but has components similar to the other components of the rotation angle detection device 1 of this embodiment. Thus, in the following description, the components of the rotation angle detection device 300 which correspond to those of the rotation angle detection device 1 are respectively provided with same reference numbers as the rotation angle detection device 1.

Referring to FIG. 8, the Hall elements 30 and 31 of the rotation angle detection device 300 are mounted at a printed circuit board 310 which is attached to a supporting member. The Hall elements 30 and 31 are connected with the ECU 90, respectively via twisted pair cables 340 and 341.

The twisted pair cable 340 is constructed of a signal wire 346 and a ground wire 344 which are stranded with each other. The twisted pair cable 341 is constructed of a signal wire 348 and a ground wire 345 which are stranded with each other. In this case, the Hall elements 30 and 31 are connected with the twisted pair cables 340 and 341 through the printed circuit board 310.

Figure 9:
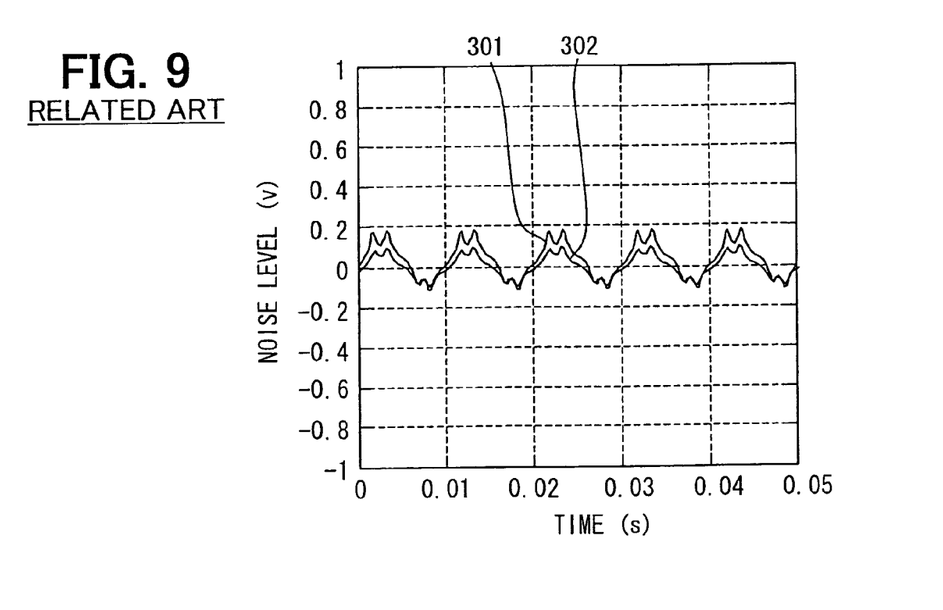
FIG. 9 is a graph showing a measure result of a noise experiment of the rotation angle detection device of the second comparison example according to the related art.

FIG. 9 shows a detection result of the noise piggybacked onto the output signal of the rotation angle detection device 300 of the second comparison example. The detection result is measured under the same condition as that of the measurement (referring to FIG. 7) of the noise piggybacked onto the output signal of the rotation angle detection device 200 of the first comparison example.

Referring to FIG. 9, the induction noise 301 of substantial 0.7 mV and the induction noise 302 of substantial 0.7 mV are respectively piggybacked onto the output signal transmitted by the signal wire 346 and that transmitted by the signal wire 348. According to the detection result, the induction noise of the output signal can be reduced, by using the twisted pair cables to transmit the output signal.

However, the noise of substantial 0.7 mv with respect to the 5V-wide output signal corresponds to the rotation angle of 0.050° of the detection object. Therefore, the rotation angle detection device 300 cannot detect the rotation angle of the detection object with accuracy beyond 0.050°.

Moreover, because the Hall elements 30 and 31 are connected with the twisted pair cables 340 and 341 through the printed circuit board 310, the number of the components of the rotation angle detection device 300 increases as compared with the rotation angle detection device 1 where the Hall elements 30 and 31 are directly connected with the FPC 40.

Furthermore, the Hall elements 30 and 31 of the rotation angle detection device 300 are mounted at the printed circuit board 310, to which the twisted pair cables 340 and 341 are connected. Thus, the connection parts of the component increase as compared with the rotation angle detection device 1. Therefore, the manufacture cost of the rotation angle detection device 300 will increase.

Figure 10A:
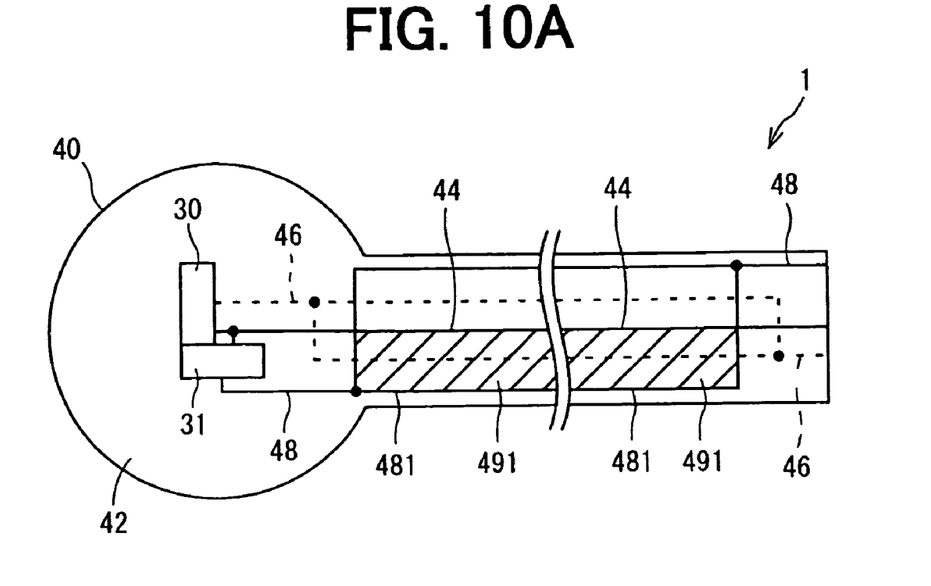
FIG. 10A is a schematic view showing a loop constructed of a ground wire and a first branch portion of a signal wire to explain a noise countermeasure according to the preferred embodiment.
Figure 10B:
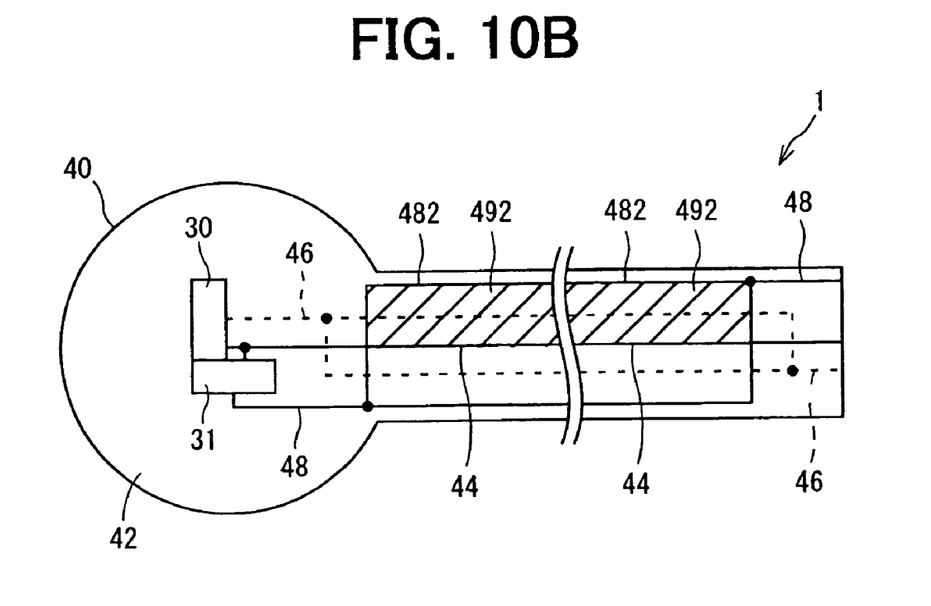
FIG. 10B is a schematic view showing a loop constructed of the ground wire and a second branch portion of the signal wire to explain the noise countermeasure.
Figure 11:
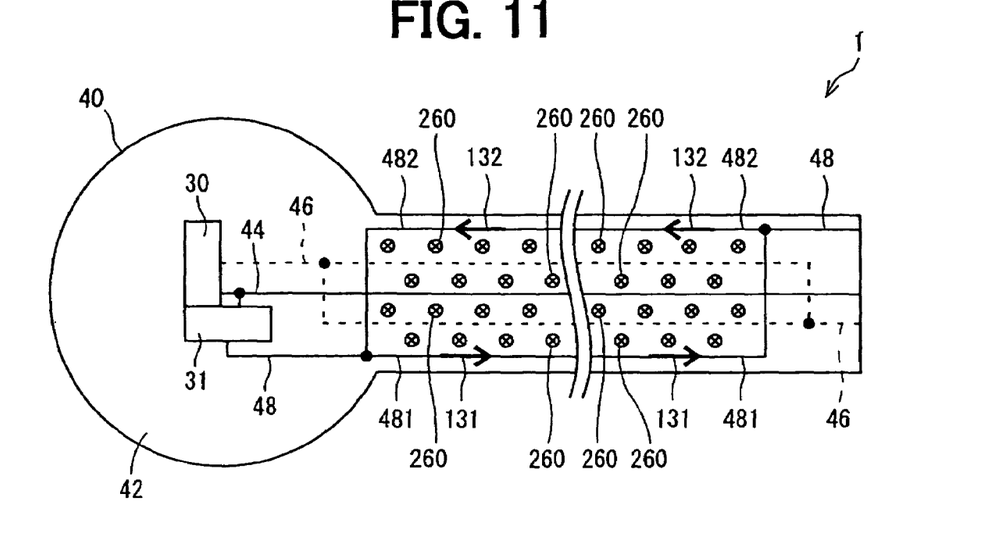
FIG. 11 is a schematic view showing induction electromotive forces occurring at the first branch portion and the second branch portion to explain the noise countermeasure according to the preferred embodiment.

FIGS. 10A-11 show the noise countermeasure provided for the rotation angle detection device 1 according to this embodiment.

According to this embodiment of the present invention, the first branch portion 481 and the second branch portion 482 of the signal wire 48 respectively construct two circuits which share the ground wire 44 as a common feedback path. Thus, there occurs at the first branch portion 481 an induction electromotive force, which corresponds to a variation of the magnetic flux passing through a loop 491 (indicated by diagonally shaded areas in FIG. 10A) constructed by the first branch portion 481 and the ground wire 44. Moreover, there occurs at the second branch portion 482 an induction electromotive force, which corresponds to a variation of the magnetic flux passing through a loop 492 (indicated by diagonally shaded areas in FIG. 10B) constructed by the second branch portion 482 and the ground wire 44.

Because the first branch portion 481 and the second branch portion 482 of the signal wire 48 are respectively arranged at the two opposite sides of the ground wire 44

(that is, ground wire 44 is interposed between first branch portion 481 and second branch portion 482), the direction (indicated by arrow 131 in FIG. 11) of the induction electromotive force occurring at the first branch portion 481 is contrary to the direction (indicated by arrow 132 in FIG. 11) of the induction electromotive force occurring at the second branch portion 482. That is, even when the induction electromotive force occurs at the signal wire 48, the induction electromotive force occurring at the first branch portion 481 and that occurring in the second branch portion 482 substantially balance each other out. Thus, the induction noise piggybacked onto the output signal 101 transmitted via the signal wire 48 can be restricted.

Figure 12:
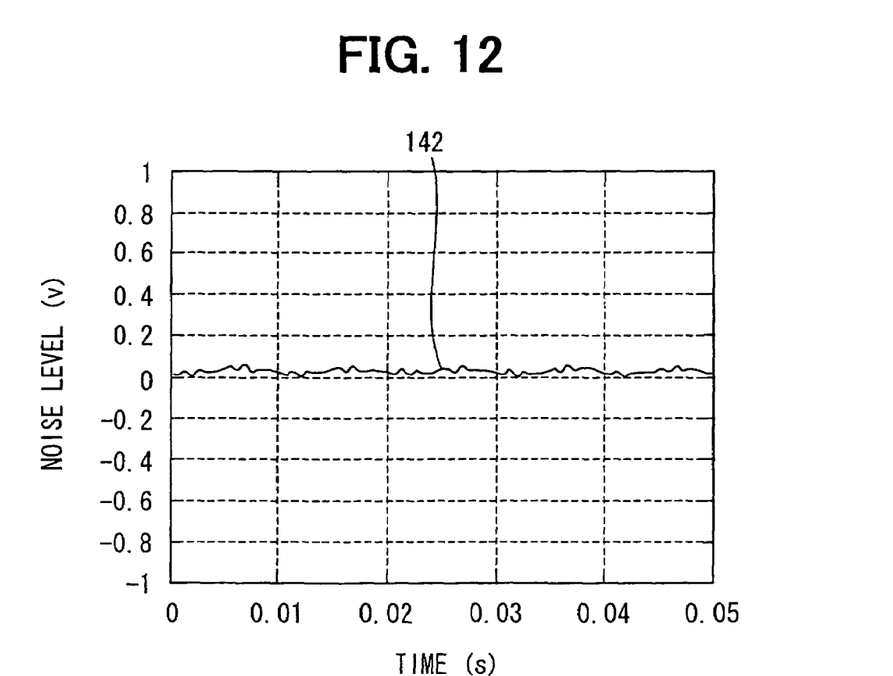
FIG. 12 is a graph showing a measure result of a noise experiment of the rotation angle detection device according to the preferred embodiment.

FIG. 12 shows a detection result of the noise piggybacked onto the output signal 101 transmitted via the signal wire 48. The detection result is measured under the same condition as that of the measurement (referring to FIG. 7) of the noise piggybacked onto the output signal of the rotation angle detection device 200 of the first comparison example.

Referring to FIG. 12, the noise 142 of substantial 0.015 mV is piggybacked onto the output signal transmitted via the signal wire 48. The induction noise of substantial 0.015 mv with respect to the 5V-wide output signal corresponds to the rotation angle of 0.001° of the detection object. Thus, according to the rotation angle detection device 1 of this embodiment, the induction noise can be effectively reduced as compared with the case where the twisted pair cables are used to transmit the output signal. Therefore, the detection error of the rotation angle detection device 1 can be restricted.

However, in the case where the amplitude of the induction electromotive force occurring at the first branch portion 481 of the signal wire 48 is different from that occurring at the second branch portion 482 of the signal wire 48, the induction noise due to the difference of the induction electromotive forces will be piggybacked onto the output signal transmitted via the signal wire 48. Therefore, it is desirable to carry out wiring for the signal wire 48 so that the amplitude of the induction electromotive force occurring at the first branch portion 481 is substantially equal to that occurring at the second branch portion 482.

Next, the wiring of the signal wire 48 of the rotation angle detection device 1 will be described.

At first, the wiring of the signal wire 48 is carried out in such a manner that the first distance (which is dimension perpendicular to extension direction of first branch portion 481 and ground wire 44) between the first branch portion 481 of the signal wire 48 and the ground wire 44 is substantially equal to the second distance (which is dimension perpendicular to extension direction of second branch portion 482 and ground wire 44) between the second branch portion 482 of the signal wire 48 and the ground wire 44. Thus, the difference between the first distance and the second distance can be reduced, so that the difference between the area of the loop 491 and the area of the loop 492 is restricted. Therefore, with reference to the formula (5), the difference between the amplitude of the induction electromotive force occurring at the first branch portion 481 of the signal wire 48 and that occurring at the second branch portion 482 of the signal wire 48 can be reduced.

Then, the wiring of the signal wire 48 is carried out so that the first branch portion 481 and the second branch portion 482 are in the proximity of each other.

In the case where the variation of the magnetic flux passing through the loop 491 and that passing though the loop 492 are different from each other, there will occur a difference between the amplitude of the induction electromotive force generated at the first branch portion 481 and that generated at the second branch portion 482.

For example, in the case where there exists a rotation angle range where the magnetic field generated by the permanent magnets 22 and 24 do not influence the loop 491 or the loop 492, the variation of the magnetic flux passing through the loop 491 and that passing through the loop 492 are different from each other at the designated rotation angle range.

Specifically, in the vicinity of the rotation angle shown in FIG. 3B, both of the loop 491 and the loop 492 are influenced by the parallel magnetic field generated by the permanent magnets 22 and 24. Therefore, the variation of the magnetic flux passing through the loop 491 and that passing through the loop 492 are substantially equal to each other.

On the other hand, in the vicinity of the rotation angle shown in FIG. 3A, the part of the FPC 40 where the loop 492 is constructed is not influenced by the magnetic field generated by the permanent magnets 22 and 24. Therefore, the magnetic flux passing through the loop 491 increases while the magnetic flux passing through the loop 492 does not vary.

In contrast, in the vicinity of the rotation angle shown in FIG. 3C, the part of the FPC 40 where the loop 491 is constructed is not influenced by the magnetic field generated by the permanent magnets 22 and 24. Therefore, the magnetic flux passing through the loop 492 decreases while the magnetic flux passing through the loop 491 does not vary.

However, as described above, the first branch portion 481 and the second branch portion 482 of the signal wire 48 according to this embodiment are arranged in the proximity of each other. Thus, the variation of the magnetic flux passing through the loop 491 and that passing though the loop 492 can become substantially equal to each other. Therefore, the difference between the amplitude of the induction electromotive force generated at the first branch portion 481 and that generated at the second branch portion 482 can be reduced, with reference to the formula (5).

According to this embodiment, the signal wire 46 is provided with the first branch portion 461 and the second branch portion 462 which are provided with the wiring similar to that of the first branch portion 481 and the second branch portion 482 of the signal wire 48. Thus, the induction noise of the output signal transmitted via the signal wire 46 can be also reduced similarly to the signal wire 48.

OTHER EMBODIMENTS

Although the present invention has been fully described in connection with the preferred embodiments thereof with reference to the accompanying drawings, it is to be noted that various changes and modifications will become apparent to those skilled in the art.

In the preferred embodiment, the electromechanical conversion device 1 which is exampled as the rotation angle detection device has the two Hall elements 30 and 31 as the magnetism detection elements. However, the electromechanical conversion device 1 can be also provided with the single magnetism detecting element. Alternatively, the electromechanical conversion device 1 can be also provided with at least the three magnetism detecting elements.

Moreover, the FPC 40 used as the cable can be provided with a single-layer construction or a multiple-layer construction. In the case where the FPC 40 is provided with the multiple-layer construction, the signal wires 46 and 48 can be respectively formed at different layers so that both of the signal wires 46 and 48 are in the proximity of the ground wire 44. Thus, the induction noise of both of the electrical signal transmitted via the signal wire 46 and that transmitted via the signal wire 48 can be effectively reduced, as compared with the case where one of the signal wires 46 and 48 is arranged at the outer side of the other with respect to the ground wire 44.

Furthermore, the wiring of the signal wires 46 and 48 can be also carried out, respectively along the different ground wires.

Moreover, the Hall elements 30 and 31 can be also connected with the ECU 90, respectively via different cables (i.e., FRC). That is, the signal wires 46 and 48 can be also respectively formed at the different FPC.

Moreover, the ground wire and the single wire can be also constructed of a lead frame which is formed by stamping or etching a thin metal plate or the like. In this case, the ground wire and the signal wire can be integrated with a lead frame of the Hall elements 30 and 31.

Furthermore, the magnetism detection element can be also constructed of a magnetic reluctance element such as an anisotropy magnetic reluctance element and a giant magnetic reluctance element.

Moreover, the electromechanical conversion device 1 according to the present invention can be also suitably used to convert the electrical signals (which are inputted to electromechanical conversion unit) into a relative rotation of the electromechanical conversion unit with respect to the magnetic field generation unit. For example, the electromechanical conversion device 1 can be suitably used as a synchronous motor which has a stator as the electromechanical conversion unit and a rotor as the magnetic field generation unit.

Moreover, the present invention can be also suitably used for the electromechanical conversion device 1 where the electromechanical conversion unit linearly moves relatively to the magnetic field generation unit.

Such changes and modifications are to be understood as being in the scope of the present invention as defined by the appended claims.

What is claimed is:

1. An electromechanical conversion device comprising:
   a magnetic field generation unit for generating a magnetic field;
   an electromechanical conversion unit which performs one of a first conversion and a second conversion based on the magnetic field,
   the first conversion being a conversion from a relative movement of the electromechanical conversion unit with respect to the magnetic field generation unit, to electrical signals,
   the second conversion being a conversion from electrical signals inputted to the electromechanical conversion unit, to a relative movement of the electromechanical conversion unit with respect to the magnetic field generation unit; and
   a cable which is connected with the electromechanical conversion unit, wherein
   the cable includes
      a ground wire for connecting the electromechanical conversion unit with ground; and
      at least one signal wire which is connected with the electromechanical conversion unit to transfer the electrical signals,
      the signal wire having a first branch portion and a second branch portion, which extend substantially parallel to the ground wire and are respectively arranged at two opposite sides of the ground wire to interpose the ground wire therebetween,
      two ends of the second branch portion being respectively connected with two ends of the first branch portion.

2. The electromechanical conversion device according to claim 1, wherein
   the electromechanical conversion unit converts the relative movement of the electromechanical conversion unit with respect to the magnetic field generation unit, into the electrical signals.

3. The electromechanical conversion device according to claim 2, wherein:
   the electromechanical conversion unit relatively rotates with respect to the magnetic field generation unit due to a rotation of a detection object, so that the magnetic field relatively varies with respect to the electromechanical conversion unit;
   the electromechanical conversion unit has a magnetism detection member for outputting the electrical signals responding to the magnetic field; and
   the ground wire and the signal wire are connected with the magnetism detection member.

4. The electromechanical conversion device according to claim 3, wherein
   the magnetism detection member includes a first magnetism detection element and a second magnetism detection element, each of which outputs the electrical signals responding to the magnetic field which relatively varies due to the rotation of the detection object,
   the electrical signal of the first magnetism detection element having a different phase from that of the second magnetism detection element.

5. The electromechanical conversion device according to claim 4, wherein:
   the cable has the two signal wires, which are respectively connected with the first magnetism detection element and the second magnetism detection element to transfer the electrical signals; and
   the first magnetism detection element and the second magnetism detection element share the ground wire to be connected with the ground.

6. The electromechanical conversion device according to claim 3, wherein:
   the cable further includes an electrically insulating member with a substantial film shape, the ground wire and the signal wire being fixed to the electrically insulating member; and
   the magnetism detection member is directly fixed to the cable.

7. The electromechanical conversion device according to claim 1, wherein:
   the ground wire and the signal wire are arranged in a substantially same plane; and
   a distance between the first branch portion of the signal wire and the ground wire is substantially equal to that between the second branch portion of the signal wire and the ground wire.

8. The electromechanical conversion device according to claim 1, wherein the first branch portion and the second branch portion of the signal wire are arranged in the proximity of each other.

* * * * *